Feb. 22, 1966  S. A. BOTTONARI ET AL  3,236,967
SWITCHGEAR HAVING MANUAL AND MOTOR
OPERATED SPRING CHARGING MEANS
Filed March 15, 1963

Feb. 22, 1966    S. A. BOTTONARI ET AL    3,236,967
SWITCHGEAR HAVING MANUAL AND MOTOR
OPERATED SPRING CHARGING MEANS
Filed March 15, 1963    6 Sheets-Sheet 6

WITNESSES:
Bernard R. Giguere
James F. Young

INVENTORS
Samuel A. Bottonari, Glenn E. Rhodes,
and Howard C. Peppel.
BY
Clement L. McHale
ATTORNEY

United States Patent Office 3,236,967
Patented Feb. 22, 1966

3,236,967
SWITCHGEAR HAVING MANUAL AND MOTOR OPERATED SPRING CHARGING MEANS
Samuel A. Bottonari, Wilkinsburg, Glenn E. Rhodes, Monroeville, and Howard C. Peppel, Franklin Township, Westmoreland County, Pa., assignors to Westinghouse Electric Corporation, Pittsburgh, Pa., a corporation of Pennsylvania
Filed Mar. 15, 1963, Ser. No. 265,390
11 Claims. (Cl. 200—92)

This invention relates, generally, to metal-enclosed switchgear and, more particularly to operating mechanisms for switchgear units generally of the type described in Patent No. 3,054,874, issued September 18, 1962, to R. E. Dickinson and Paul Olsson.

In the aforesaid patent there is described a switchgear unit in which a series-connected power fuse and a load-break disconnect switch are provided for each phase of a three-phase circuit. The fuses and switches are mounted on a drawout truck which can be inserted into and withdrawn from a metal-enclosed switchgear cell having contact members therein engaged by contact members on the truck. A single manually charged spring is utilized to open and close the switches as a unit and a manually operated time delay device prevents the switches from being reopened immediately after being closed, thereby giving the fuses time to interrupt the circuit in case the switches are closed against a low-current fault.

An object of this invention is to provide a mechanism for charging the opening and closing spring of a switch which may be operated either manually or by a motor.

Another object of the invention is to provide a stored energy mechanism for operating a switch which is automatically charged after each closing or opening operation of the switch.

A further object of the invention is to provide a reversible motor operated mechanism for charging a spring which is without travel limit restrictions during coasting of the motor.

A still further object of the invention is to provide a motor driven spring charging mechanism which does not require resetting after manual operation of the mechanism.

Still another object of the invention is to provide limit switches and auxiliary switches which cooperate to control the operation of the motor which operates the spring charging mechanism.

Other objects of the invention will be explained fully hereinafter or will be apparent to those skilled in the art.

In accordance with the present invention, a reversible motor drives a rotatable arm through a speed reducer. The arm engages a forked handle casting on the switch mechanism shaft and rotates it 90° to charge the main operating spring in the same manner as by manual rotation of the handle casting. As soon as the operating spring is discharged the motor mechanism will operate to recharge the spring for the next switch operation if control power is available for the motor. If power is not available the spring can be charged manually, and the motor-driven mechanism does not require resetting when power is restored. Limit switches actuated by motor mechanism and auxiliary switches actuated by the main switch shaft cooperate to control the operation of the motor driven mechanism, and to prevent interference between motor operation and manual operation.

For a better understanding of the nature and objects of the invention, reference may be had to the following detailed description, taken in conjunction with the accompanying drawing, in which.

Figure 1:
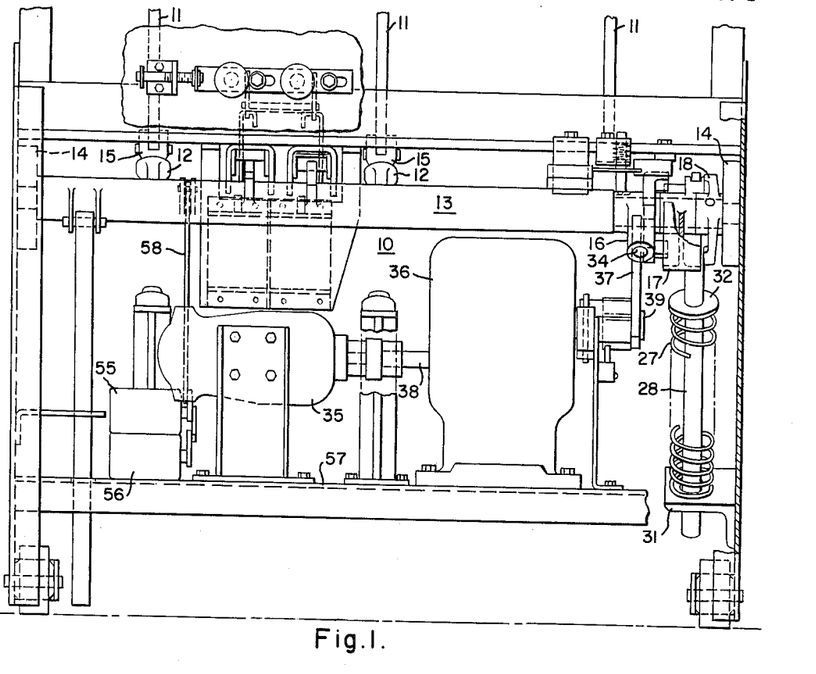
FIGURE 1 is a view, in front elevation, of a portion of a metal-enclosed switchgear unit embodying the principal features of the invention.
Figure 2:
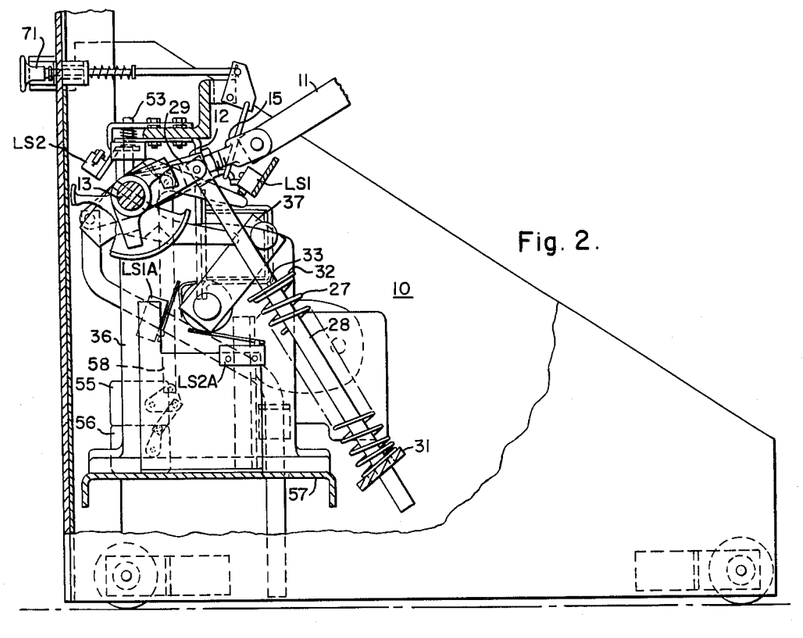
FIG. 2 is a view, partly in section and partly in side elevation, of the switchgear structure shown in FIG. 1.

Referring to the drawings, and particularly to FIGS. 1 and 2, the structure shown therein comprises a drawout switchgear unit suitable for utilization in a metal-enclosed switchgear cell (not shown). The drawout unit 10 and the cell may be generally of the type described in the aforesaid Patent 3,054,874. As described in the aforesaid patent, the drawout unit 10 may be provided with a three-pole disconnecting switch and three power fuses, one of which is connected in series circuit relation with each pole of the switch. The contact members of the switch may be opened and closed by means of three insulating pull rods 11, one for each pole, which are pivotally attached to arms 12 formed integrally with an operating shaft 13 rotatably mounted in bearings 14 on the drawout unit 10. The pull rods 11 may be adjustably attached to the arms 12 by means of generally U-shaped members 15 having shanks threaded into the arms 12.

Figure 3:
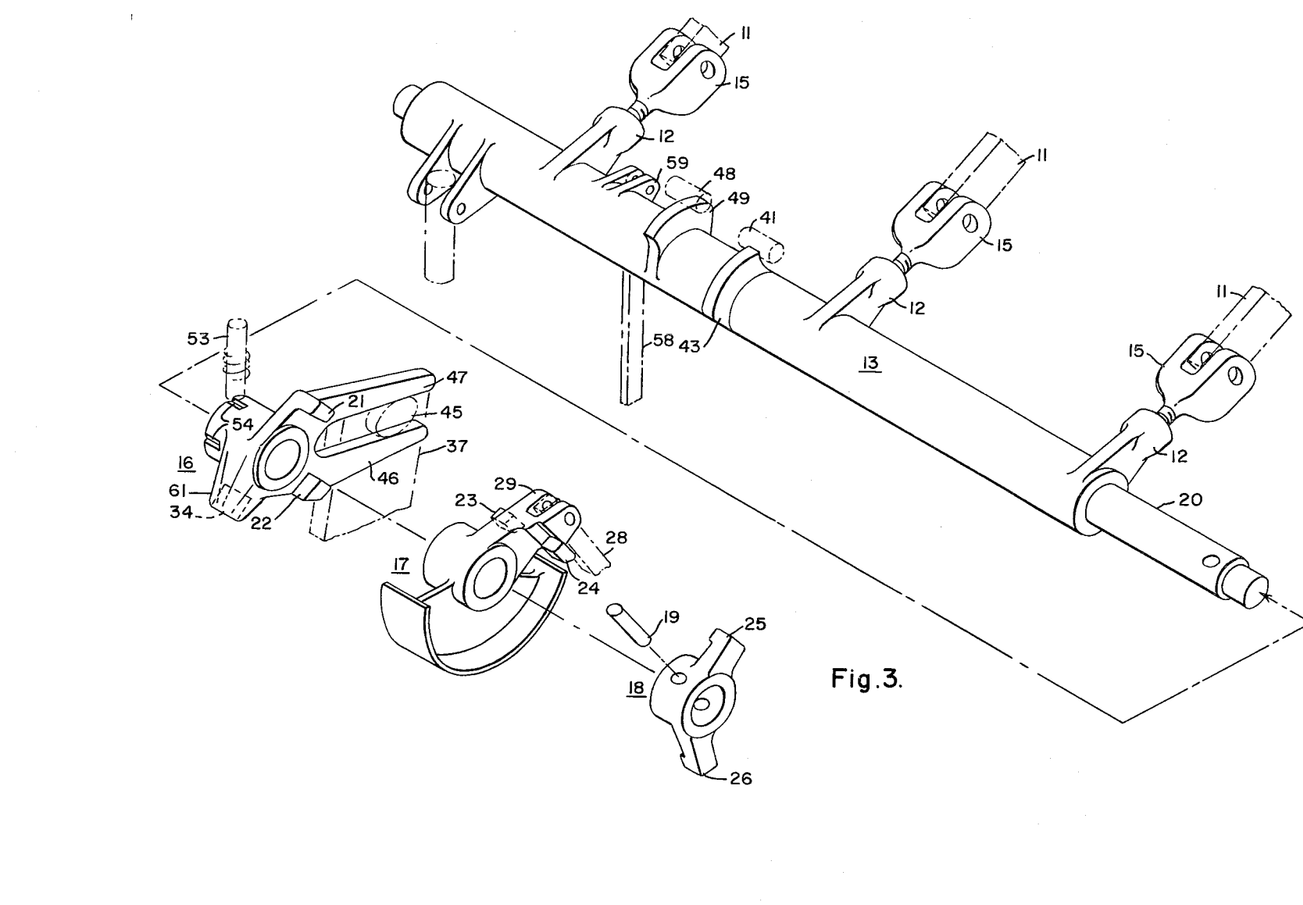
FIG. 3 is an exploded view, in perspective, of the operating shaft for the switchgear unit.

As shown most clearly in FIG. 3, the operating shaft 13 has a reduced portion 20 at one end on which are disposed an operating lever 16, a spring lever 17 and a driving lever 18. The driving lever 18 is secured to the shaft by means of a pin 19 which extends through the hub of the lever 18 and the shaft 13. The operating lever 16 and the spring lever 17 are free to rotate on the reduced portion 20 of the shaft 13.

The hubs of the levers 16, 17 and 18 are disposed on the shaft 13 in side-by-side relation and the lever 16 has two spaced projections 21 and 22 thereon which are disposed to engage a projection 23 on the lever 17, thereby providing a lost-motion connection between the levers 16 and 17. The lever 17 has a projection 24 thereon which is disposed to engage spaced arms 25 and 26 on the driving lever 18, thereby providing a lost-motion connection between the lever 17 and the lever 18.

The energy for operating the switch during both opening and closing is stored in an energy storing device, such as a compression spring 27. The spring 27 is disposed on a shaft 28 having one end pivotally attached to an arm 29 of the spring lever 17. As shown most clearly in FIG. 2, the other end of the shaft 28 is slidably disposed in an opening in a bracket 31 on the frame of the drawout unit 10. The spring 27 may be compressed between the bracket 31 and a retaining washer 32 on the shaft 28. Movement of the washer 32 towards the upper end of the shaft 28 is limited by a pin 33 extending through the shaft 28.

The spring 27 may be charged either manually by inserting a rod in an opening 34 in the operating lever 16, or by means of a motor operated mechanism comprising a reversible motor 35, a gear reduction unit 36 and a rotatable arm 37 which is driven by the motor 35 through the gear reduction unit 36. The motor 35 is connected to the gear unit 36 by means of a shaft 38, and the arm 37 is secured to an output shaft 39 of the gear unit 36.

In FIGS. 1 and 2 of the drawings, the switch is shown closed and the spring 27 is discharged. That is, the energy of the spring has been expended by its action in closing the switch.

The first step in opening the switch is to charge or compress the spring 27. This may be done manually by inserting a rod in the opening 34 in the operating lever 16 and raising the rod to rotate the lever 16 clockwise as viewed from the right in FIG. 3. When the lever 16 is rotated clockwise the projection 21 engages the projection 23 on the spring lever 17. This rotates the spring lever 17 clockwise to compress the spring 27.

Figure 4:
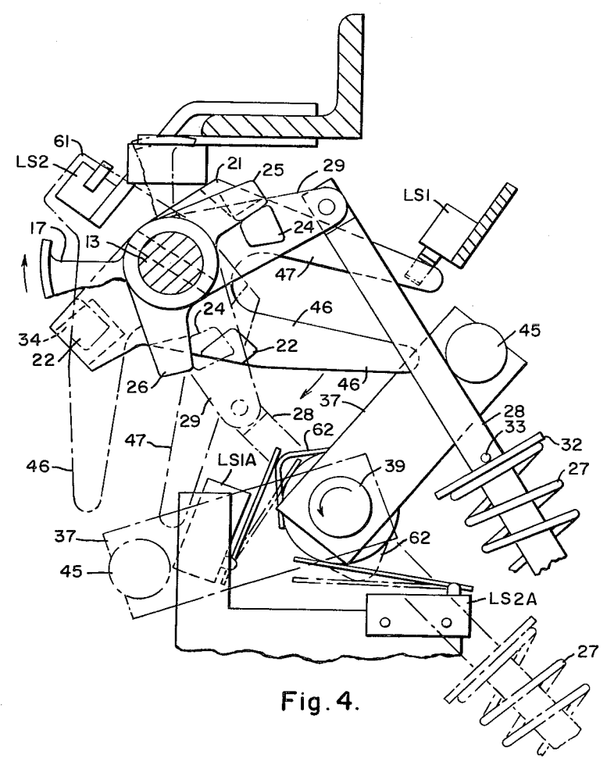
FIGS. 4 and 5 are enlarged detail views showing the operation of the operating mechanism during spring charging in preparation for opening of the contact members of the switch.
Figure 5:
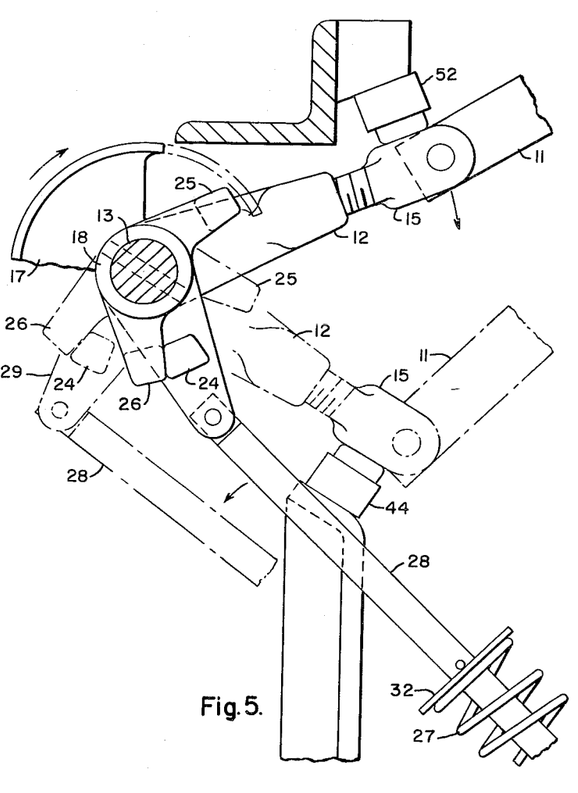

As shown most clearly in FIGS. 4 and 5, when the shaft 28 has just passed dead-center, the projection 24 on the spring lever 17 engages the arm 26 of the drive lever 18 which is secured to the operating shaft 13. As shown most clearly in FIGS. 3 and 8, the shaft 13 is prevented from rotating at this time by a roller 41 on a tripping latch assembly 42 which engages a cam 43 on the shaft 13. Thus, energy remains stored in the spring 27 until the shaft 13 is permitted to rotate by actuating the tripping mechanism to release the roller 41 from the cam 43 as will be described more fully hereinafter. When the roller 41 is released the energy in the spring 27 actuates the driving lever 18 to the position shown by the dot-dash lines in FIG. 5, thereby rotating the shaft 13 and actuating the arms 12 to the position shown by the dot-dash lines and opening the contact members of the switch. The opening movement of the arms 12 is stopped by bumpers 44 which are engaged by the members 15 as shown in FIG. 5.

As explained hereinbefore, the spring 27 is preferably charged by means of the motor driven mechanism. As shown most clearly in FIGS. 3 and 4, a roller 45 on the rotating arm 37 is disposed to enter the space between two fork arms 46 and 47 on the operating lever 16 when the arm 37 is rotated counterclockwise. Thus, the roller 45 engages the fork arm 46 to rotate the arms 46 and 47 and the operating lever 16 to the position shown by the dot-dash lines in FIG. 4. This compresses the spring 27 in the manner hereinbefore described. Energy will remain stored in the spring until released in the manner previously described to open the contact members of the switch.

As shown by the dot-dash lines in FIG. 4, the arm 37 has traveled far enough to cause the roller 45 to be entirely clear of the fork arms 46 and 47 on the operating lever 16. This is accomplished by limit switches as will be described more fully hereinafter. Likewise, the arm 37 travels sufficiently when it is being rotated clockwise to charge the spring 27 in preparation for closing of the switch to cause the roller 45 to be entirely clear of the arms 46 and 47 as shown by the full lines in FIG. 4. In this manner, the arm 37 and the roller 45 do not interfere with the manual operation of the operating lever 16 to charge the spring 27.

Figure 6:
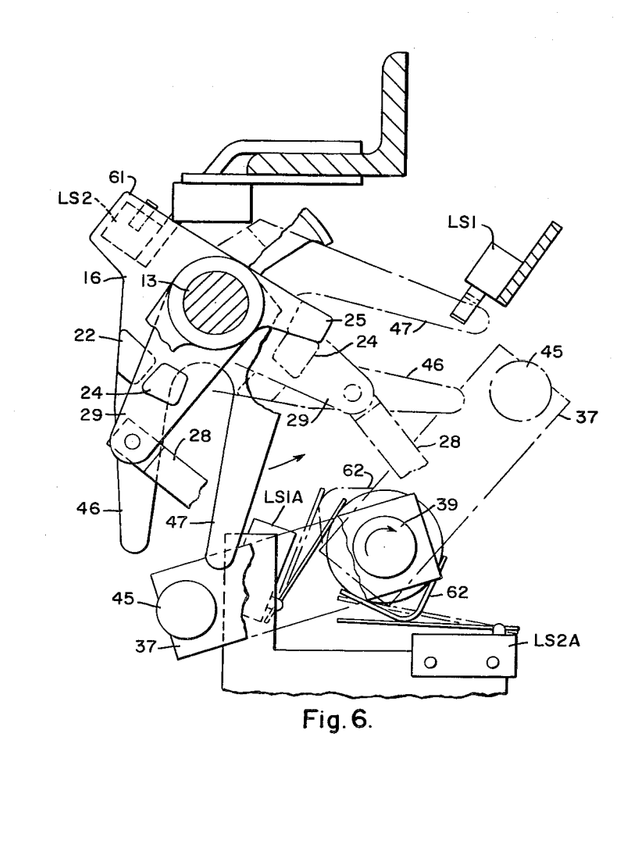
FIGS. 6 and 7 are views, similar to FIGS. 4 and 5, showing the operation of the mechanism during spring charging in preparation for closing of the switch.
Figure 9:
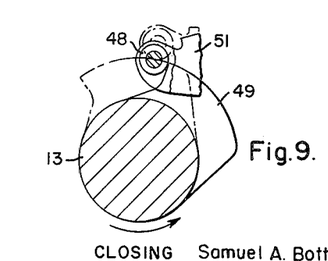
FIG. 9 is a view, similar to FIG. 8, showing a portion of the closing mechanism.

In order to charge the spring 27 in preparation for a closing operation of the switch, the arm 37 is rotated clockwise, as shown in FIG. 6, by the gear unit 36 and the motor 35. When the arm 37 is rotated clockwise the roller 45 engages the fork arm 47 to drive the operating lever 16 counterclockwise. The projection 22 on the lever 16 engages the projection 23 which is directly behind the projection 24 on the spring lever 17 as viewed in FIG. 6. The spring lever 17 is rotated counterclockwise to compress the spring 27 until the spring shaft 28 and the arm 29 just pass over their dead-center position. In this position the projection 24 on the spring lever 17 engages the arm 25 of the driving lever 18. However, the driving lever 18 cannot rotate the operating shaft 13 in a counterclockwise direction since rotation of the shaft 13 is prevented by a roller 48 engaging a cam 49 on the shaft 13 as shown in FIG. 9. Thus, energy is stored in the spring 27 until the roller 48 is released from the cam 49 by means of a closing release mechanism, only a portion 51 of which is shown in FIG. 9.

Figure 7:
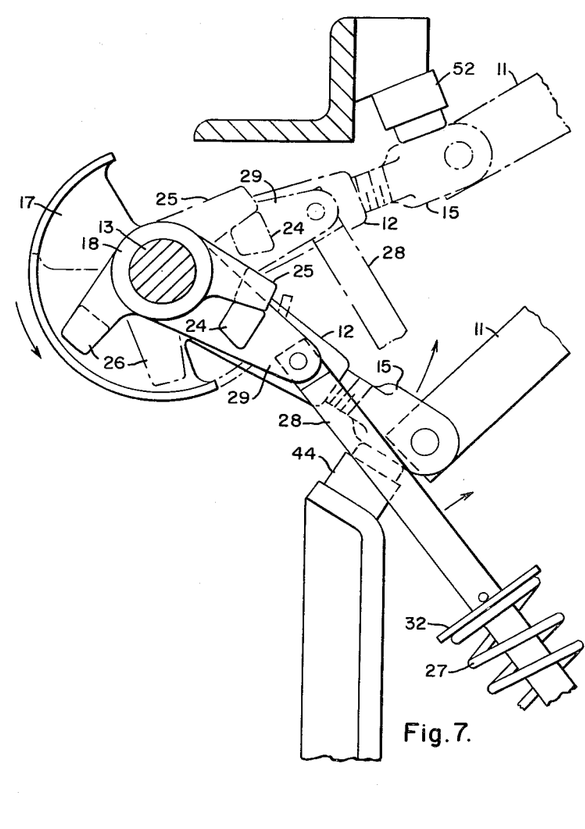

The closing release mechanism is similar to the tripping release mechanism 42, the operation of which will be described more fully hereinafter. When the roller 48 is released from the cam 49 the spring lever 17 actuates the driving lever 18 to rotate the shaft 13 and close the contact members of the switch by rotating the arms 12 to the position shown by the dot-dash lines in FIG. 7. Movement of the arms 12 in a counterclockwise direction is stopped by a bumper 52.

As previously explained, the arm 37 travels to a position in which the roller 45 is entirely clear of the fork arms 46 and 47 upon completion of the charging of the spring 27. As shown most clearly in FIG. 3, the operating lever 16 is releasably retained in the position to which it was last actuated by a spring biased detent 53 which engages depressions 54 in the hub of the operating lever 16.

The operation of the spring charging mechanism is controlled by limit switches LS1, LS2, LS1A and LS2A, which cooperate with auxiliary switches contained in housings 55 and 56 mounted on a cross member 57 which also supports the spring charging mechanism. The auxiliary switches are operated by a link 58 which is pivotally attached to an arm 59 on the shaft 13. The limit switch LS1 is actuated by the fork arm 47 of the operating lever 16. The limit switch LS2 is actuated by an extension 61 on the hub of the operating lever 16. The limit switches LS1A and LS2A are actuated by a lobe 62 on the hub of the arm 37 which is driven by the output shaft 39 of the gear unit 36.

The main limit switches LS1 and LS2 have normally closed contact members and the auxiliary limit switches LS1A and LS2A have normally open contact members. In the diagram shown in FIG. 11 the auxiliary switches which are open when the main contact members of the switch are open are designated by the letter *a*. The auxiliary switches which are closed when the main contact members of the switch are open are designated by the letter *b*.

Assuming that the spring 27 has just been discharged to close the main switch, the arm 37 will be in the position shown by the full lines in FIG. 4. At this time the limit switch LS1 is open, the limit switch LS2 is closed and auxiliary contact members *a*1 and *a*2 are closed. Thus, a circuit is established for the motor 35 which extends from a power conductor L1 through the field winding F, the limit switch LS2, the auxiliary switch *a*1, the armature winding A of the motor, and the auxiliary switch *a*2, to the conductor L2. The motor 35 drives the arm 37 counterclockwise to engage the fork arm 46 and actuates the operating lever 16 to the position shown by the dot-dash lines in FIG. 4. When in this position, the limit switch LS2 is opened by the projection 61 on the lever 16. However, just before the roller 45 moves out of the forked lever 16, the lobe 62 on the arm 37 closes the auxiliary limit switch LS2A. Since the contact members of the limit switches LS2 and LS2A are connected in parallel, the motor 35 will continue to run for a short time after the spring is charged. This will carry the arm 37 to a position in which the roller 45 is entirely clear of the fork arms 46 and 47, thereby preventing interference with manual operation of the spring charging mechanism in the manner previously described.

As explained hereinbefore, the spring 27 remains charged and the motor 35 is deenergized until the energy of the spring is released to open the main switch. When the main switch is opened, a circuit is established for the motor 35 to drive the arm 37 clockwise from the position shown by the full lines in FIG. 6 to the position shown by the dot-dash lines, thereby recharging the spring 27 in preparation for closing the contact members of the main switch. At this time the circuit for the motor 35 extends from the power conductor L1 through the field winding F, the limit switch LS1, auxiliary switch b2, the armature winding A, and auxiliary switch b1 to the power conductor L2. When the fork arm 47 reaches the position shown by the dot-dash lines in FIG. 6 it opens the limit switch LS1. However, the contact members of the limit switch LS1A are closed by the lobe 62 on the arm 37 to maintain the circuit for the motor 35 until the arm 37 is carried to a position in which the roller 45 is entirely clear of the fork arms 46 and 47.

In the foregoing manner, the spring 27 is immediately recharged after either an opening or a closing operation of the main switch. If power is not available to operate the motor 35 to recharge the spring, it may be recharged manually in the manner hereinbefore described. Since the arm 35 is entirely disengaged from the forks 46 and 47 after each charging operation it will not interfere with manual charging of the spring. Furthermore, the arm 37 is automatically operated to a position in which it will engage the arms 46 and 47 when power is restored. This is accomplished by means of the limit switches and the auxiliary switches.

Assume that power fails immediately after the spring 27 has been discharged to close the main switch, thereby leaving the arm 37 in the position shown by the full lines in FIG. 4. If the lever 16 is manually operated to charge the spring 27 the fork arms 46 and 47 will be actuated to the position shown by the dot-dash lines in FIG. 4. When the fork arms are in this position the limit switch LS1 is closed and the limit switch LS2 is open. The limit switches LS1A and LS2A are both opened. If power is now restored, nothing happens since the "b" auxiliary switches remain open until the spring 27 is discharged to open the main switch. When the main switch is opened, a circuit is established for the motor 35 from the power conductor L1 through the field winding F, the limit switch LS1, auxiliary contact members b2, the armature winding A, and auxiliary contact members b1 to the power conductor L2, thereby rotating the arm 37 clockwise from the position shown by the full lines in FIG. 4 to the position shown by the full lines in FIG. 6 where it can engage the fork arm 47 in its normal manner to recharge the spring 27 in preparation for a closing operation of the switch. Thus, the arm 37 and the fork arms 46 and 47 cannot get out of step with each other. Likewise, if power should fail while the switch is open, the spring may be charged manually to close the switch, and the arm 37 and the fork arms 46 and 47 will get in their proper positions when power is restored.

Figure 8:
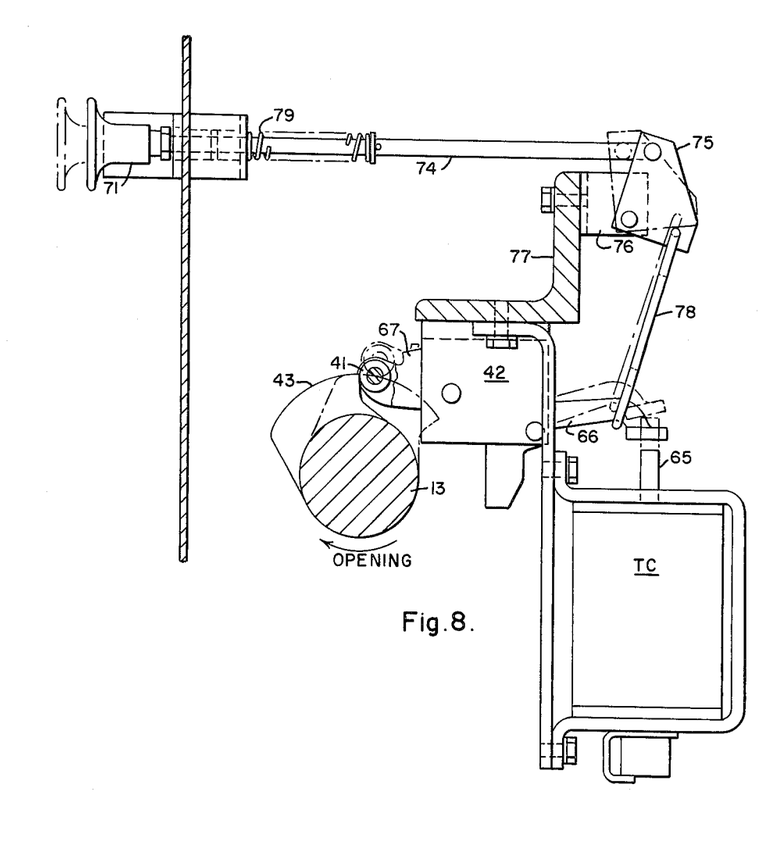
FIG. 8 is a view, partly in section and partly in side elevation, of the tripping mechanism for the switch.
Figure 10:
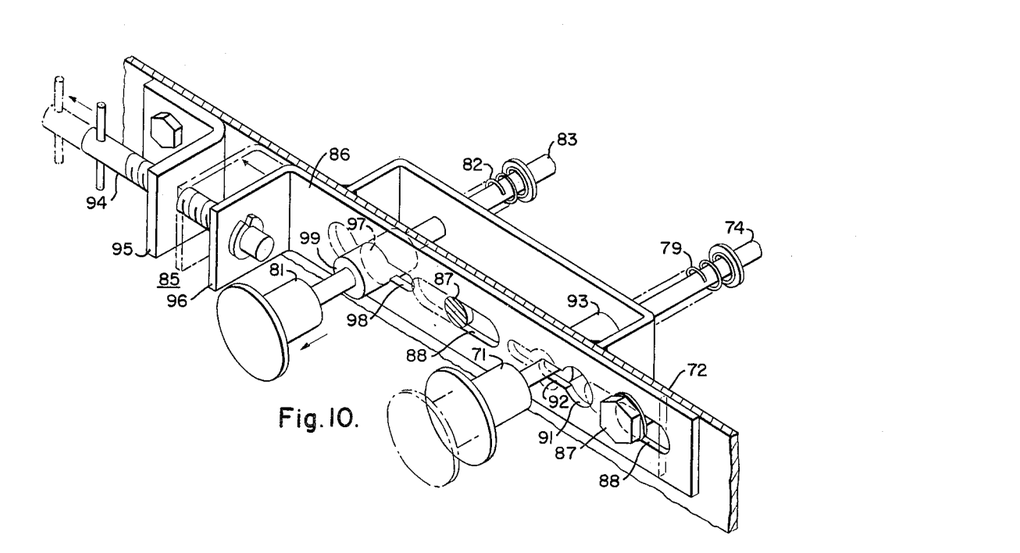
FIG. 10 is an isometric view of a time delay mechanism for controlling closing and opening of the switch.

The operation of the tripping and the closing release mechanisms may be most clearly understood by referring to FIGS. 8, 9 and 10. As shown in FIG. 8, the roller 41 engages the cam 43 on the shaft 13 to prevent rotation of the shaft clockwise to open the main switch. The roller 41 may be released from the cam 43 by means of an electrically energized, remotely controlled tripping coil TC. When the coil TC is energized, a plunger 65 is raised to raise a lever 66 of the tripping latch mechanism 42. When the lever 66 is raised a lever 67 of the tripping mechanism 42 is released to permit the roller 41, which is carried by the lever 67, to be released from the cam 43 and permit the shaft 13 to rotate clockwise.

Figure 11:
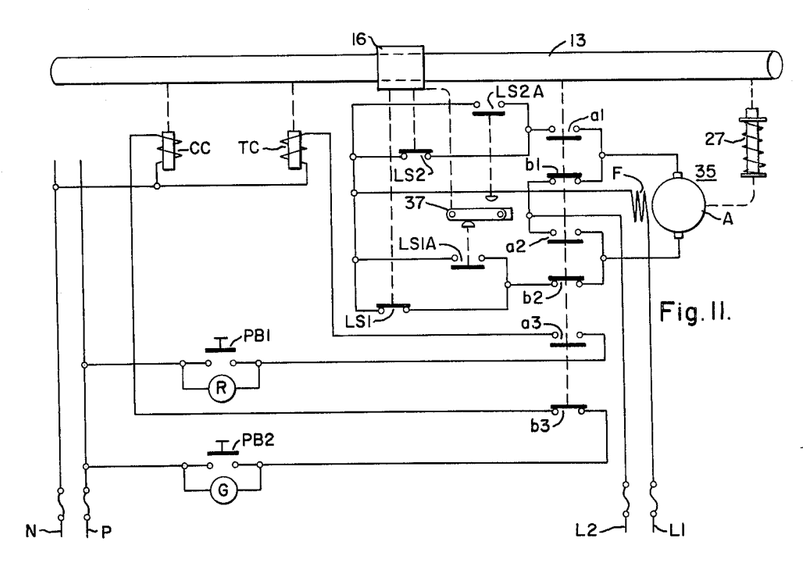
FIG. 11 is a diagrammatic view of the control system for the spring charging and releasing mechanisms.

The energization of the trip coil TC is controlled by a push button PB1 as shown in FIG. 11. When the push button PB1 is closed a circuit extends from a positive conductor P through the push button PB1, an auxiliary switch a3, and the trip coil TC to a negative conductor N. It will be noted that an indicating lamp R is connected in series with the trip coil TC while the main switch is closed, thereby indicating that the main switch is closed. Since the indicating lamp and the trip coil TC are in series circuit relation, they do not draw enough current to operate the trip coil TC until the push button PB1 is closed to short-circuit the indicating lamp R.

The lever 66 may also be raised manually to release the tripping mechanism 42 by means of a knob 71 which is mounted on a front panel 72 of the switch unit 10. The knob 72 is secured on one end of a rod 74, the other end of which is attached to a bell crank lever 75 pivotally mounted on a bracket 76 attached to a cross member 77 which also supports the tripping and the closing mechanisms. The bell crank lever 75 is connected to the lever 66 by means of a link 78. The lever 66 rests in a generally U-shaped portion of the link 78 so that the lever 66 may be raised by the plunger 65 without interference by the link 78. When the knob 71 is pulled to the left, as shown in FIG. 8, the lever 66 is raised, thereby releasing the tripping mechanism 42. When the knob 71 is released, it is returned to the position shown by the full lines in FIG. 8 by a compression spring 79.

The closing release mechanism is similar to the tripping release mechanism and, therefore, has not been illustrated completely in the present drawings. As shown in FIG. 9, the roller 48 engages the cam 49 on the shaft 13 to prevent counterclockwise rotation of the shaft 13 to close the contact members of the main switch. The roller 48 may be released from the cam 49 by means of an electrically operated closing coil, similar to the tripping coil TC. As shown in FIG. 11, when a push button switch PB2 is closed, a circuit extends from the positive conductor P through the switch PB2, an auxiliary switch b3, and the closing coil CC to the negative conductor N.

The closing mechanism may also be manually released in a manner similar to the tripping mechanism. When a knob 81 is pulled to the position shown in FIG. 10, the closing mechanism is released to permit closing of the main switch. When the knob 81 is released, it is returned to its normal position by a compression spring 82 disposed on a rod 83 which corresponds to the rod 74 of the tripping mechanism.

In order to prevent reopening of the main switch immediately after closing, a time delay device 85 is provided. It is desirable to prevent immediate reopening of the switch in case it is closed against an overload condition in order to give the fuses time to open the circuit prior to the opening of the switch, thereby protecting the contact members of the switch. As shown in FIG. 10, the time delay device 85 comprises a bar 86 slidably mounted on the panel 72. The bar 86 is mounted on the panel 72 by means of screws 87 disposed in elongated slots 88 in the bar 86. As shown, the rod 74 extends through a key-hole slot having an enlarged portion 91 and a narrow portion 92. When the bar 86 is in the position shown by the full lines in which the rod 74 is in the narrow portion 92 of the key-hole slot the knob 71 and the rod 74 cannot be moved outwardly to release the tripping mechanism in the manner previously described. Outward movement of the knob 71 is prevented by a sleeve 93 secured to the rod 74. In order to pull the knob 71 outwardly, it is necessary to first move the bar 86 to the left as shown in FIG. 10. This may be done by turning a screw 94 which is threaded through a bracket 95 on the panel 72 and is rotatably attached to an angle portion 96 of the bar 86. As the screw 94 is moved to the left it carries the bar 86 to the position shown by the dot-dash lines, thereby placing the enlarged portion 91 of the key-hole slot in front of the sleeve 93 to permit the knob 71 and the rod 74 to be pulled outwardly to release the tripping mechanism. The time required to move the bar 86 to the left by means of the screw 94 provides the necessary time delay to permit the fuses to interrupt the overload circuit.

Before the closing mechanism can be manually released to close the main switch, the bar 86 must be returned to the position shown by the full lines, thereby placing an enlarged portion 97 of a key-hole slot in front of a sleeve 99 secured to the rod 83. When this is done, the knob 81 can be pulled outwardly to release the closing mechanism. Otherwise a narrow portion 98 of the key-hole slot prevents outward movement of the knob 81 and the rod 83. Thus, in order to close the main switch, the bar 86 must be first returned to the position shown by the full lines in which outward movement of the knob 71 is prevented by the narrow portion 92 of the key-hole slot. Therefore, the switch cannot be opened after having been closed until the bar 86 is moved to the left by means of the screw 94 in the manner previously described. When the spring 27 is charged by means of the motor operated mechanism, the time required for the motor 35 to rotate the arm 37 through the high reduction gear unit 36 to charge the spring provides the necessary time delay between operations of the main switch.

From the foregoing description it is apparent that the invention provides for charging a stored energy mechanism either manually or by a motor operated mechanism. The motor operated mechanism is so constructed and so operated that it does not interfere with manual charging of the stored energy mechanism. Under normal conditions the stored energy mechanism is immediately recharged by the motor operated mechanism after either a closing or an opening operation of the switch which is actuated by the stored energy mechanism. In the event that it is necessary to manually charge the stored energy mechanism because of failure of the power source for operating the motor mechanism, resumption of operation by the motor mechanism automatically takes place upon the restoration of the control power. Provision is also made for either manual or electrical operation of the tripping and the closing releasing mechanisms for releasing the energy of the stored energy mechanism to actuate the switch.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a switch unit, in combination, a multipole switch having contact members for each pole, an operating shaft rotatably mounted in the unit for opening and closing said contact members, stored energy means for driving said shaft to open and close said contact members, lever means rotatably mounted on the shaft for charging the stored energy means, a reversible motor, and means operated by said motor for intermittently actuating said lever means.

2. In a switch unit, in combination, a multipole switch having contact members for each pole, an operating shaft rotatably mounted in the unit and rotatable in opposite directions to alternately open and close said contact members, stored energy means for driving said shaft in said opposite directions through a lost-motion connection, lever means rotatably mounted on said shaft for charging said stored energy means, a reversible motor, motor driven means, upon the occurrence of a first energized operation of said reversible motor said motor driven means being operated in a first direction to engage and actuate said lever means in a first direction to change said stored energy means and at the end of said first energized operation said motor driven means moving to a position disengaged from said lever means, upon the occurrence of a second energized operation of said reversible motor said motor driven means being operated in a second direction opposite from said first direction to engage and actuate said lever means in a second direction to charge said stored energy means and at the end of said second energized operation said motor driven means moving to a position disengaged from said lever means.

3. In a switch unit, in combination, a multipole switch having contact members for each pole, an operating shaft rotatably mounted in the unit for opening and closing said contact members, stored energy means for driving said shaft, lever means rotatably mounted on the shaft for charging the stored energy means, a reversible motor, motor driven means, upon the occurrence of a first energized operation of said reversible motor said motor driven means being operated in a first direction to engage and actuate said lever means in a first direction to change said stored energy means and at the end of said first energized operation said motor driven means moving to a position disengaged from said lever means, upon the occurrence of a second energized operation of said reversible motor and said motor driven means being operated in a second direction opposite from said first direction to engage and actuate said lever means in a second direction to charge said stored energy means and at the end of said second energized operation said motor driven means moving to a position disengaged from said lever means and said lever means being manually operable to charge said stored energy means when said lever means is disengaged from said motor driven means.

4. In a switch unit, in combination, a multipole switch having contact members for each pole, an operating shaft rotatably mounted in the unit for opening and closing said contact members, stored energy means for driving said shaft through a lost-motion connection, lever means rotatably mounted on the shaft for charging the stored energy means, an arm rotatable in opposite directions through an arc, said arm first engaging said lever means while traveling through a portion of said arc to actuate the lever means and thereafter moving to a position disengaged from said lever means, and reversible means for driving the arm.

5. In a switch unit, in combination, a multipole switch having contact members for each pole, an operating shaft rotatably mounted in the unit for opening and closing said contact members, stored energy means for driving said shaft through a lost-motion connection, lever means rotatably mounted on the shaft for charging the stored energy means, an arm rotatable in opposite directions through an arc, said arm first engaging said lever means while traveling through a portion of said arc to actuate the lever means and thereafter moving to a position disengaged from said lever means, reversible means for driving the arm, and said lever means being manually operable when it is not engaged by said arm.

6. Operating means for an electric switch having contact members comprising a shaft rotatable in one direction to open the contact members and in the opposite direction to close the contact members, stored energy means for driving said shaft in both directions, a forked lever rotatably mounted on the shaft and operable to charge the stored energy means, an arm rotatable in opposite directions during successive operations thereof, during each of said successive operations said arm engaging said lever to operate said lever and thereafter moving to a position disengaged from said lever, and reversible means for driving said arm.

7. Operating means for an electric switch having contact members comprising a shaft rotatable in one direction to open the contact members and in the opposite direction to close the contact members, stored energy means for driving said shaft in both directions, a forked lever rotatably mounted on the shaft and operable to charge the stored energy means, an arm rotatable in opposite directions during successive operations thereof, during each of said successive operations said arm engaging said lever to operate said lever and thereafter moving to a position disengaged from said lever, reversible means for driving said arm, and limit switches actuated by said lever for controlling the operation of the reversible means.

8. Operating means for an electric switch having contact members comprising a shaft rotatable in one direction to open the contact members and in the opposite direction to close the contact members, stored energy means for driving said shaft in both directions, a forked lever rotatably mounted on the shaft and operable to charge the stored energy means, an arm rotatable in opposite directions during successive operations thereof, during each of said successive operations said arm engaging said lever to operate said lever and thereafter moving to a position disengaged from said lever, reversible means for driving said arm, limit switches actuated by said lever, and additional limit switches actuated by the reversible means and cooperating with the first named limit switches to control the reversible means.

9. Operating means for an electric switch having contact members comprising a shaft rotatable in one direction to open the contact members and in the opposite direction to close the contact members, stored energy means for driving said shaft in both directions, a forked lever rotatably mounted on the shaft and operable to charge the stored energy means, an arm rotatable in opposite directions during successive operations thereof, during each of said successive operations said arm engaging said lever to operate said lever and thereafter moving to a position disengaged from said lever, reversible means for driving said arm, limit switches actuated by said lever, additional limit switches actuated by the reversible means, and auxiliary switches actuated by said shaft and cooperating with said limit switches to control the operation of the reversible means.

10. Operating means for an electric switch having contact members comprising a shaft rotatable in one direction to open the contact members and in the opposite direction to close the contact members, stored energy means for driving said shaft in both directions, a forked lever rotatably mounted on the shaft and operable to charge the stored energy means, an arm rotatable in opposite directions during successive operations thereof, during each of said successive operations said arm engaging said lever to operate said lever and thereafter moving to a position disengaged from said lever a gear reduction unit for driving said arm, a reversible motor for driving the gear reduction unit, limit switches actuated by the lever, auxiliary switches actuated by the shaft and cooperating with the limit switches to control the motor to recharge the stored energy means after each operation of the switch, electrically operable means for releasing the stored energy means, additional auxiliary switches actuated by the shaft, and manually operable means cooperating with the additional auxiliary switches to control the energization of the electrically operable means.

11. In a switch unit, in combination, a multipole switch having contact members for each pole, an operating shaft rotatably mounted in the unit for opening and closing said contact members, stored energy means for driving said shaft through a lost-motion connection, lever means rotatably mounted on the shaft for charging the stored energy means, a reversible motor, motor driven means, upon the occurrence of a first energized operation of said reversible motor said motor driven means being operated in a first direction to engage and actuate said lever means in a first direction to change said stored energy means and at the end of said first energized operation said motor driven means moving to a position disengaged from said lever means, upon the occurrence of a second energized operation of said reversible motor said motor driven means being operated in a second direction opposite from said first direction to engage and actuate said lever means in a second direction to charge said stored energy means at the end of said second energized operation said motor driven means moving to a position disengaged from said lever means, said lever means being manually operable to charge said stored energy means when said lever means is disengaged from said motor driven means, a first manually operable means for releasing the stored energy means to close the switch, a second manually operable means for releasing the stored energy to open the switch, and time delay means for controlling the operation of said first and second manually operable means to prevent the reopening of the switch immediately after closing.

References Cited by the Examiner
UNITED STATES PATENTS

| | | | |
|---|---|---|---|
| 2,269,604 | 1/1942 | Schwager | 200—92 |
| 3,017,030 | 1/1962 | Alexander et al. | 200—92 |
| 3,072,763 | 1/1963 | Goodwin | 200—92 |

BERNARD A. GILHEANY, *Primary Examiner.*

ROBERT K. SCHAEFER, *Examiner.*